United States Patent [19]
Rodighiero

[11] Patent Number: 5,340,629
[45] Date of Patent: Aug. 23, 1994

[54] ADHESIVE TAPE

[76] Inventor: Gerald D. Rodighiero, R.R. #2, Box 520A, Anna, Ill. 62906

[21] Appl. No.: 102,300

[22] Filed: Aug. 5, 1993

[51] Int. Cl.$^5$ .............................................. C09J 7/02
[52] U.S. Cl. ...................... 428/40; 428/194; 428/343
[58] Field of Search ............ 428/40, 343, 202, 203, 428/194

[56] References Cited

U.S. PATENT DOCUMENTS

| | | |
|---|---|---|
| 1,707,515 | 4/1929 | Evans . |
| 1,726,744 | 9/1929 | Krug . |
| 2,822,286 | 2/1958 | Vogt .................... 428/343 |
| 4,082,875 | 4/1978 | Citron . |
| 4,582,737 | 4/1986 | Torgerson et al. . |
| 4,994,300 | 2/1991 | Itou et al. . |
| 5,098,786 | 3/1992 | Hanke . |
| 5,153,043 | 10/1992 | Wang . |
| 5,194,299 | 3/1993 | Fry . |

FOREIGN PATENT DOCUMENTS 0603780  8/1978  Switzerland ..................... 428/343

*Primary Examiner*—Jenna L. Davis
*Attorney, Agent, or Firm*—Richard C. Litman

[57] ABSTRACT

An adhesive tape comprising a strip of material having an adhesive-free side and a side opposite the adhesive-free side having an adhesive-coated intermediate portion bounded between oppositely disposed adhesive-free marginal portions. The adhesive tape is preferably translucent to permit a user to visually detect the adhesive-free marginal portions on the opposite side of the strip of material, thus permitting the use to easily locate the leading edges adhesive tape. In this way, both of the leading edges may be readily separated from an underlying layer of a roll of adhesive tape or readily separated from an underlying release strip. Moreover, the adhesive-coated intermediate portion preferably extends a majority of the lateral extent of the adhesive tape providing enough adhesive to permit practical use of the adhesive tape.

2 Claims, 2 Drawing Sheets

ADHESIVE TAPE

BACKGROUND OF THE INVENTION

1. Field of the Invention

The present invention relates to adhesive tape and, more particularly, to an adhesive tape comprising a flexible strip of material having an adhesive-coated intermediate portion bounded between oppositely disposed adhesive-free marginal portions.

2. Description of the Prior Art

The use of adhesive tape is commonplace in the medical profession. For example, healthcare professionals utilize adhesive tape to secure canulas to a patient when blood is being drawn or when intravenous treatment is being provided. In addition, adhesive tape is used when treating open wounds. In each of these forms of treatment, the healthcare professional is exposed to the patient's blood and due to the possible exposure to blood borne pathogens (HBV and HIV) it is an OSHA regulation that protective gloves be worn. For the most part, adhesive tape is generally provided in a roll for the user's convenience. This enables a user to remove a desired length of tape from the roll depending on the amount of tape needed in a particular application. Unfortunately, it is difficult to find the leading edge of the tape when the tape is wound in the form of a roll and once the leading edge is located, separating the same from the roll can be a tedious task. This task becomes even more cumbersome for the healthcare professional who is required to wear gloves in the course of performing his or her duties. To overcome this obstacle, adhesive tape is needed which may be conveniently provided in a roll and which would permit the leading edge thereof to be easily located and separated from the roll.

Applicant proposes a roll of adhesive tape having an intermediate portion coated with adhesive and marginal portions free of adhesive. The adhesive-free marginal portions permit the user to easily find the leading edge of the adhesive tape and separate the leading edge from the roll. Such an adhesive tape configuration would not be limited to tapes used in the medical arts practice, but would also be of value when applied to packaging tape, masking tape, duct tape, and so on.

Adhesive tapes having discrete adhesive-coated surfaces are well known in the prior art. For example, U.S. Pat. No. 1,707,515, issued Apr. 2, 1929 to Harold A. Evans, discloses a flexible strip of fabric having marginal portions coated with adhesive material and intermediate portions free from adhesive. The strip of adhesive material may be conveniently provided for use in rolls.

Another adhesive tape is disclosed in U.S. Pat. No. 1,726,744, issued Sep. 3, 1929 to Albert J. Krug. Krug discloses a tape having a first gummed surface adjacent to one edge of one side thereof and a second gummed surface disposed on an opposite side adjacent to an edge opposite the edge of the first gummed surface.

Yet another tape is disclosed in U.S. Pat. No. 4,082,875, issued Apr. 4, 1978 to Samuel Citron. Citron discloses a tape having adhesive extending part way across one face and the full length thereof thus leaving the remaining portion free of adhesive.

A roll of double surfaced adhesive tape is disclosed in U.S. Pat. No. 4,582,737, issued Apr. 15, 1986 to Gary D. Torgerson et al. Torgerson discloses a roll of adhesive tape comprising a cylindrical core and an elongated adhesive strip wound onto the cylindrical core. The adhesive strip comprises a center portion and edge portions. One edge portion includes an upper side that is surfaced with adhesive and a lower side that is not surfaced with adhesive. An opposite edge portion includes a lower side that is surfaced with adhesive and an upper side that is not surfaced with adhesive. A center portion is not adhesively surfaced on either its upper or lower side.

A tape is disclosed in U.S. Pat. No. 4,994,300, issued Feb. 19, 1991 to Kazumi Itou et al. The tape has an adhesive layer formed all over one side thereof and a non-adhesive layer having a predetermined width formed on the adhesive layer. The width of the non-adhesive layer is less than that of the adhesive layer so as to render opposite edges of the adhesive layer exposed.

Another adhesive tape is disclosed in U.S. Pat. No. 5,098,786, issued Mar. 24, 1992 to Jürgen Hanke. Hanke discloses a double-faced adhesive tape having two areas on each side separated by a midline. One area on each side is coated with adhesive and is opposite an area coated with non-adhesive on the other side. The other area on each side is coated with non-adhesive and is opposite an area coated with adhesive on the other side. The tape is folded along the midline with one adhesive-coated area adhering to a non-adhesive-coated area. A narrow margin is left free of adhesive along at least one of the adhesive-coated areas to facilitate exposing adhesive-coated area when unfolding the folded tape.

A roll of laterally tearing tape strips is disclosed in U.S. Pat. No. 5,153,043, issued Oct. 6, 1992 to Chung C. Wang. Wang discloses a roll of laterally tearing tape strips, each having a portion thereof which does not include adhesive. This portion serves as a leading edge to facilitate in the removal of the laterally tearing tape strips from the roll.

An adhesive sheet material is disclosed U.S. Pat. No. 5,194,299, issued Mar. 16, 1993 to Arthur L. Fry. The adhesive sheet material has an adhesive stripe along a single edge thereof.

None of the above inventions and patents, taken either singly or in combination, is seen to describe the instant invention as claimed.

SUMMARY OF THE INVENTION

The present invention is a roll of adhesive tape which comprises a strip of material having two sides, one side being adhesive-free and an opposite side having an adhesive-coated intermediate portion bounded between oppositely disposed adhesive-free marginal portions. The strip of material is preferably elongated and flexible, may be either woven or non-woven, and either natural or synthetic. It should be noted that the strip of material may be transparent or translucent so as to permit a user to visually detect that the adhesive coating occupies only an intermediate portion of the opposite side of the strip of material and that the marginal portions are free of adhesive so as to provide leading edges which may be easily located and readily separated from the roll of adhesive tape. The adhesive-coated intermediate portion should extend a majority of the lateral extent of the strip of material, providing enough adhesive to make practical use of the adhesive tape.

To form the roll of adhesive tape, the strip of material is wound about a cylindrical core. Alternatively, individual strips of material may be provided and a release strip may be releasably attached to these strips of material so as to conceal the adhesive-coated intermediate portion. Upon removal of the release strip, the adhesive-coated intermediate portion is exposed. Similar to the aforementioned roll of adhesive tape, the adhesive-free marginal portions permit the leading edges to be easily located and separated from the release strip.

Accordingly, it is a principal object of the invention to provide a roll of adhesive tape which comprises an adhesive-coated intermediate portion bounded between oppositely disposed adhesive-free marginal portions, whereby the adhesive-free marginal portions provide easily discernable leading edges for readily separating the of adhesive tape from the roll.

It is another object that the adhesive tape be translucent so as to permit a user to visually detect the location of the leading edges thereof.

It is a further object that the adhesive-coated intermediate portion extend a majority of the lateral extent of the strip of material so as to provide enough adhesive to make practical use of the adhesive tape.

Still another object is that the adhesive tape be wound about the cylindrical core to provide a roll of adhesive tape having a gap adjacent each of the adhesive-free marginal portions whereby the gaps define the visually detectable leading edges of the adhesive tape.

It is an alternative objective to provide individual strips of adhesive tape releasably attached to a release strip so as to conceal the adhesive-coated intermediate portion, whereby upon removal of the release strip, the adhesive-coated intermediate portion is exposed.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
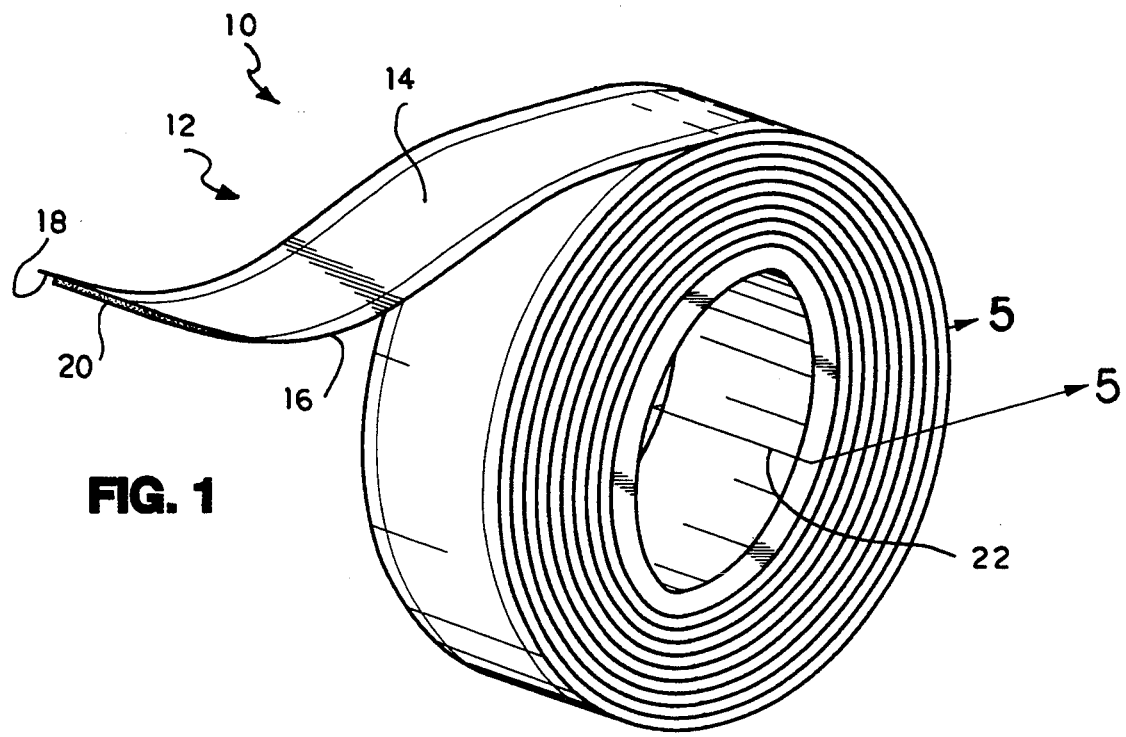
FIG. 1 is a perspective view of a roll of adhesive tape according to the present invention.

The present invention, as shown in FIG. 1 is a roll of adhesive tape 10. The roll of adhesive tape 10 comprises a strip of material 12 having a first side 14 which is adhesive-free and a second side 16 opposite the first side 14 which has oppositely disposed adhesive-free marginal portions 18 separated by an adhesive-coated intermediate portion 20.

Figure 2:
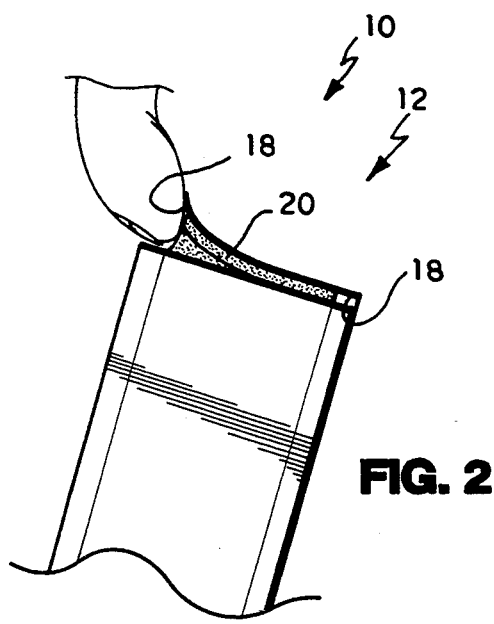
FIG. 2 is an enlarged scale, fragmentary environmental perspective view of the adhesive tape shown in FIG. 1.
Figure 3:
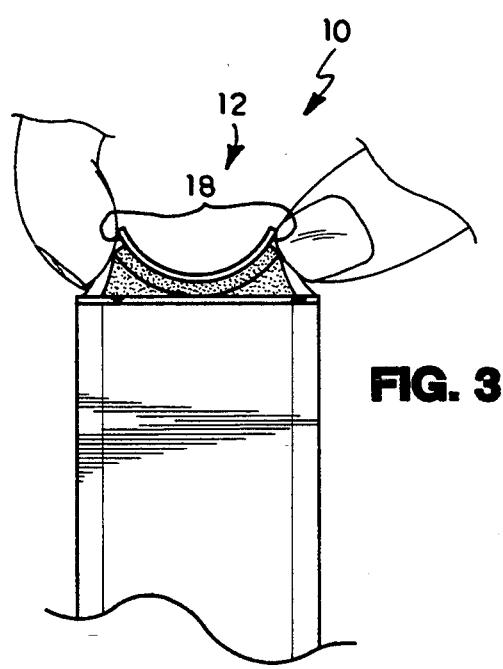
FIG. 3 is an enlarged scale, fragmentary environmental perspective view of the adhesive tape shown in FIG. 1.
Figure 5:
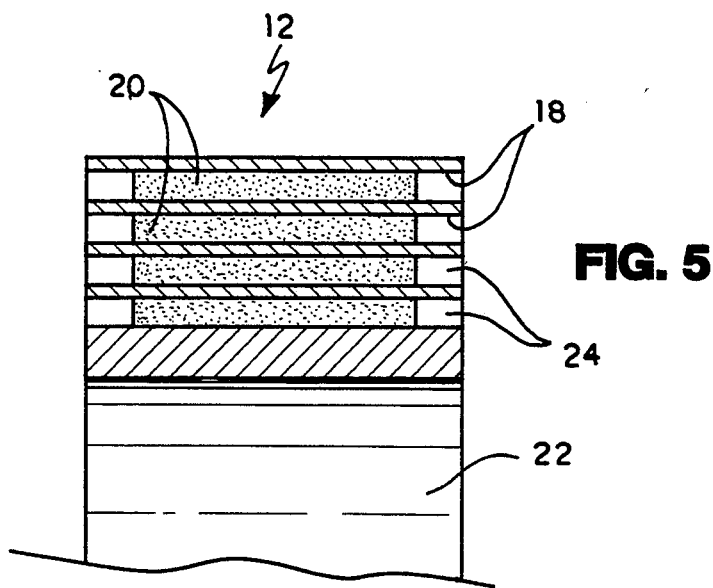
FIG. 5 is an enlarged partial cross sectional view of the roll adhesive tape drawn along the lines 5—5 of FIG. 1.

The strip of material 12 is preferably elongated and flexible so as to be easily wound about a cylindrical core 22 which supports the roll of adhesive tape 10. The strip of material 12 may be woven or non-woven depending on the particular application. A woven material may provide greater flexibility than a non-woven material. Further, a woven material is generally more breathable and has greater absorption properties than a non-woven material. A non-woven material, on the other hand, would provide a homogenous construction which may be more desirous depending on the intended use. In addition, the strip of material 12 may be fabricated of a natural fiber or a synthetic, resinous fiber which is typically less costly than a natural fiber. It should be noted that the strip of material 12 could be formed of a transparent or translucent material which permits a user to visually detect that the adhesive coating on the opposite side 16 occupies only the intermediate portion 20 of the opposite side 16 of the strip of material 12 and that the marginal portions 18 bounding the intermediate portion 20 are free of adhesive. A roll of adhesive tape 10 formed of a strip of material 12 having a configuration as described above provides a gap 24 on both sides of the roll 10 defining oppositely disposed leading edges, as are shown most clearly in FIG. 5. Referring to FIGS. 2 and 3, one or both of the leading edges may be easily located readily separated from the roll of adhesive tape 10.

Figure 4:
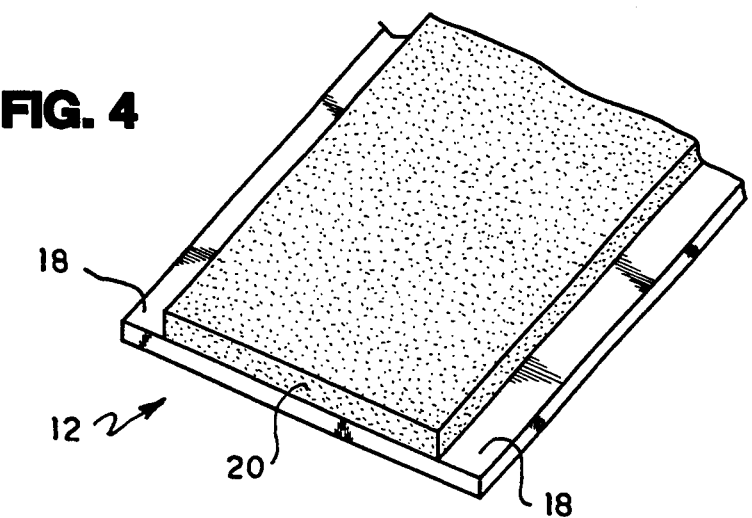
FIG. 4 is an enlarged fragmentary perspective view of a strip of material according to the present invention.

As shown in FIG. 4, it is preferable that the adhesive-coated intermediate portion 20 extend a majority of the lateral extent of the strip of material 12 so as to insure that enough adhesive surface is provided to make practical use of the roll of adhesive tape 10. It should be noted that intermediate portion 20 may be coated with a conventionally known pressure sensitive adhesive coating.

Figure 6:
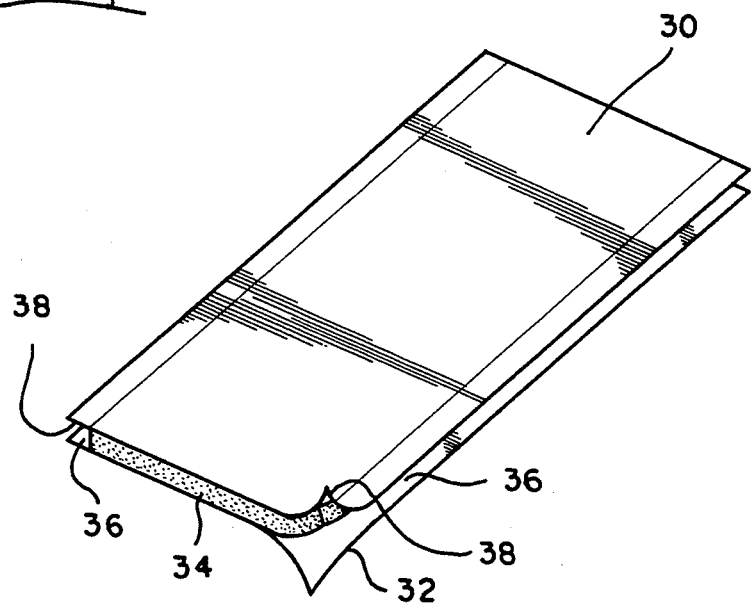
FIG. 6 is a perspective view of the adhesive tape in the form of an individual strip of material having a release strip removably attached thereto.

An alternative adhesive tape is shown in FIG. 6, wherein individual strips of material 30 of a predetermined length may be provided and a release strip 32 may be releasably attached to the strip of material 30 is so as to conceal the adhesive-coated intermediate portion 34. Upon removal of the release strip 32, the adhesive-coated intermediate portion 34 is exposed to be applied as needed. Similar to the aforementioned roll of adhesive tape 10, the release strip 32 is releasably attached to the strip of material 30 so as to provide a gap 36 adjacent each of the marginal portions 38 whereby both leading edges may be easily located and lifted or peeled back so as to remove the release strip 32 from the strip of material 30.

It is to be understood that the present invention is not limited to the embodiments described above, but encompasses any and all embodiments within the scope of the following claims.

I claim:

1. Adhesive tape for medical use by a health care worker having a pair of hands which are covered by protective gloves for protecting the worker from becoming contaminated, comprising: a strip of flexible material including:
   a first side being adhesive-free; and
   a second side opposite said first side,
   said second side having oppositely disposed adhesive-free marginal portions of sufficient lateral length to be readily grasped by the gloved hands of the health care worker and separated by an adhesive-coated intermediate portion, said intermediate portion being coated with a pressure sensitive adhesive coating, said intermediate portion extending a majority of a lateral extent of said strip of material, said strip of material being wound about itself so as to form a roll of adhesive tape, said strip of material being wound about itself so as to provide a configuration which renders a gap adjacent each of said marginal portions, whereby said gap being of sufficient extent to provide a leading edge for the health care worker wearing gloves to easily locate and separate a length of adhesive tape from said roll of tape, a flexible release liner completely underlying said adhesive tape, a liner of flexible material releasably attached to said flexible release liner underlying said adhesive tape so as to conceal said adhesive-coated intermediate portion and protect same from sticking against and possibly becoming contaminated by the glove of the worker, whereby upon removal of said flexible release liner, said adhesive-coated intermediate portion is exposed, and said liner of flexible material being releasably attached to said flexible release liner so as to provide a configuration which renders a gap adjacent each of said marginal portions, whereby said gap provides a leading edge for the health care worker wearing protection gloves to easily locate and separate a strip of adhesive tape from said roll of adhesive tape.

2. A roll of adhesive tape as recited in claim 1, said strip of flexible material being translucent and said adhesive having a readily visible color, whereby the health care worker may visually discern that said marginal portions are free of adhesive which could become stuck against a glove of the worker and inadvertently contaminate said adhesive tape.

* * * * *